United States Patent
Schlicht et al.

(10) Patent No.: US 12,430,965 B2
(45) Date of Patent: Sep. 30, 2025

(54) ACCESS CONTROL ARCHITECTURE FOR DETECTING SECURE DATA COPIED BETWEEN DEVICES

(71) Applicant: Schlage Lock Company LLC, Carmel, IN (US)

(72) Inventors: Aaron Schlicht, Golden, CO (US); Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/330,822

(22) Filed: Jun. 7, 2023

(65) Prior Publication Data
US 2023/0394897 A1    Dec. 7, 2023

Related U.S. Application Data

(60) Provisional application No. 63/349,663, filed on Jun. 7, 2022.

(51) Int. Cl.
*G07C 9/00* (2020.01)
(52) U.S. Cl.
CPC .............. *G07C 9/00309* (2013.01); *G07C 2009/00388* (2013.01)
(58) Field of Classification Search
CPC ...... G07C 9/00309; G07C 2009/00388; G07C 9/00571
See application file for complete search history.

(56) References Cited

U.S. PATENT DOCUMENTS

| 8,559,642 B2 | 10/2013 | Wurm |
| 10,237,063 B2 | 3/2019 | Brands |

(Continued)

FOREIGN PATENT DOCUMENTS

| EP | 2442204 B1 | 10/2013 |
| EP | 3529437 B1 | 7/2020 |

OTHER PUBLICATIONS

NXP; AN10922: Symmetric Key Diversifications; Jul. 2, 2019, 26 pages.

(Continued)

*Primary Examiner* — Quan Zhen Wang
*Assistant Examiner* — Rajsheed O Black-Childress
(74) *Attorney, Agent, or Firm* — Taft Stettinius & Hollister LLP

(57) ABSTRACT

A method for leveraging an access control architecture for detecting secure data copied between devices according to an embodiment includes, by a credential system, generating an authentication diversified key based on a master key and a first key diversification input, generating an encryption diversified key based on the master key and a second key diversification input, generating a credential blob including an encrypted credential for a mobile device and a portion of the second key diversification input, and transmitting the credential blob to the mobile device, and by a reader device, receiving credential data from the mobile device including an encrypted version of the credential blob, generating the encryption diversified key based on the master key and the second key diversification input, validating the credential data based on the encryption diversified key, and extracting the credential for use in an access control decision.

20 Claims, 8 Drawing Sheets

(56) References Cited

U.S. PATENT DOCUMENTS

| | | |
|---|---|---|
| 10,505,732 B2 | 12/2019 | Doliwa |
| 10,706,649 B2 | 7/2020 | Kuenzi et al. |
| 10,925,102 B2 | 2/2021 | Neafsey et al. |
| 11,023,875 B2 | 6/2021 | Eberwine et al. |
| 2018/0241561 A1 | 8/2018 | Albertson et al. |
| 2019/0218826 A1 | 7/2019 | Allen et al. |
| 2020/0026835 A1 | 1/2020 | Mitchell et al. |
| 2020/0050779 A1 | 2/2020 | Prokop et al. |
| 2020/0100108 A1* | 3/2020 | Everson ................ H04W 12/08 |
| 2020/0104826 A1 | 4/2020 | Rule et al. |
| 2020/0106615 A1* | 4/2020 | Rule ................... H04L 63/0442 |
| 2020/0106617 A1* | 4/2020 | Rule ..................... G06F 21/602 |
| 2023/0083785 A1* | 3/2023 | Maiman ............. G06Q 20/3821 340/5.65 |

OTHER PUBLICATIONS

International Search Report; International Searching Authority; International Application No. PCT/US2023/068055; Sep. 13, 2023; 2 pages.

Written Opinion of the International Searching Authority; International Searching Authority; International Application No. PCT/US2023/068055; Sep. 13, 2023; 6 pages.

Extended European Search Report; European Patent Office; European Patent Application No. 23820611.4; Jul. 7, 2025; 11 pages.

* cited by examiner

ACCESS CONTROL ARCHITECTURE FOR DETECTING SECURE DATA COPIED BETWEEN DEVICES

CROSS-REFERENCE TO RELATED APPLICATION

This application claims the benefit of U.S. Provisional Application No. 63/349,663 filed on Jun. 7, 2022, the contents of which are incorporated herein by reference in their entirety.

BACKGROUND

Access control systems typically involve the use of credentials to manage the operation of an access control device (e.g., a lock device or computing device). Access control systems currently cannot detect when secure data (e.g., a credential) has been copied from one device (e.g., a smartphone) to another device (e.g., a different smartphone). Accordingly, data copied from one device to another device maybe presented to an access control device without the access control system knowing that the data was copied. For example, a malicious device may be able to gain entry in an access control system without detection.

SUMMARY

One embodiment is directed to a unique system, components, and methods for leveraging an access control architecture for detecting secure data copied between devices. Other embodiments are directed to apparatuses, systems, devices, hardware, methods, and combinations thereof for leveraging access control architecture for detecting secure data copied between devices.

According to an embodiment, a method for leveraging an access control architecture for detecting secure data copied between devices in an access control system that includes a credential system, a mobile device, and a reader device may include generating, by the credential system, an authentication diversified key based on a master key and a first key diversification input, wherein the master key is securely stored at the credential system and at the reader device, generating, by the credential system, an encryption diversified key based on the master key and a second key diversification input, wherein the second key diversification input is a function of the first key diversification input, generating, by the credential system, a credential blob including an encrypted credential for the mobile device and a portion of the second key diversification input, transmitting, by the credential system, the credential blob to the mobile device, performing, by the reader device in response to the mobile device being presented to the reader device, mutual authentication with the mobile device to generate a session key, wherein performing the mutual authentication involves using the authentication diversified key, receiving, by the reader device, credential data from the mobile device, wherein the credential data includes an encrypted version of the credential blob, generating, by the reader device, the encryption diversified key based on the master key and the second key diversification input, wherein the second key diversification input is determined based on the portion of the second key diversification input of the credential blob and the first key diversification input, validating, by the reader device, the credential data based on the encryption diversified key, and extracting, by the reader device, the credential for use in an access control decision.

In some embodiments, the first key diversification input may be or include a random number.

In some embodiments, the second key diversification input may be based on the first key diversification input and a second random number different from the first random number.

In some embodiments, the second random number may be or include the portion of the second key diversification input.

In some embodiments, generating the authentication diversified key may include generating a first cipher-based message authentication code (CMAC) of the first key diversification input using the master key.

In some embodiments, generating the encryption diversified key may include generating a second CMAC of the second key diversification input using the master key.

In some embodiments, the method may further include storing, by the mobile device, the authentication diversified key in a secure key storage separate from the first key diversification input.

In some embodiments, the method may further include storing, by the mobile device, the first key diversification input in an encrypted file, wherein the file is encrypted by a file key stored in the secure key storage.

In some embodiments, the method may further include transmitting, by the reader device, instructions to a lock device to perform an access control action based on the extracted credential.

In some embodiments, receiving the credential data from the mobile device may include receiving credential data encrypted with the session key, and generating the encryption diversified key may include generating the encryption diversified key in response to decrypting the encrypted credential data using the session key.

According to another embodiment, an access control system for leveraging an access control architecture for detecting secure data copied between devices of the access control system may include at least one processor and at least one memory comprising a plurality of instructions stored thereon that, in response to execution by the at least one processor, causes the access control system to generate, by a credential system of the access control system, an authentication diversified key based on a master key and a first key diversification input, wherein the master key is securely stored at the credential system and at a reader device of the access control system, generate, by the credential system, an encryption diversified key based on the master key and a second key diversification input, wherein the second key diversification input is a function of the first key diversification input, generate, by the credential system, a credential blob including an encrypted credential for the mobile device and a portion of the second key diversification input, transmit, by the credential system, the credential blob to a mobile device of the access control system, perform, by the reader device in response to the mobile device being presented to the reader device, mutual authentication with the mobile device to generate a session key, wherein to perform the mutual authentication involves using the authentication diversified key, receive, by the reader device, credential data from the mobile device, wherein the credential data includes an encrypted version of the credential blob, generate, by the reader device, the encryption diversified key based on the master key and the second key diversification input, wherein the second key diversification input is determined based on the portion of the second key diversification input of the credential blob and the first key diversification input, validate, by the reader device, the credential data based on the encryption diversified key, and extract, by the reader device, the credential for use in an access control decision.

In some embodiments, the first key diversification input may be or include a random number.

In some embodiments, the second key diversification input may be based on the first key diversification input and a second random number different from the first random number.

In some embodiments, the second random number may be or include the portion of the second key diversification input.

In some embodiments, to generate the authentication diversified key may include to generate a first cipher-based message authentication code (CMAC) of the first key diversification input using the master key.

In some embodiments, to generate the encryption diversified key may include to generate a second CMAC of the second key diversification input using the master key.

In some embodiments, the plurality of instructions may further cause the access control system to store the authentication diversified key in a secure key storage of the mobile device separate from the first key diversification input.

In some embodiments, the plurality of instructions may further cause the access control system to store the first key diversification input in an encrypted file of the mobile device, wherein the file may be encrypted by a file key stored in the secure key storage of the mobile device.

In some embodiments, the plurality of instructions may further cause the access control system to transmit, by the reader device, instructions to a lock device of the access control system to perform an access control action based on the extracted credential.

In some embodiments, to receive the credential data from the mobile device may include to receive credential data encrypted with the session key, and to generate the encryption diversified key may include to generate the encryption diversified key in response to decryption of the encrypted credential data using the session key.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
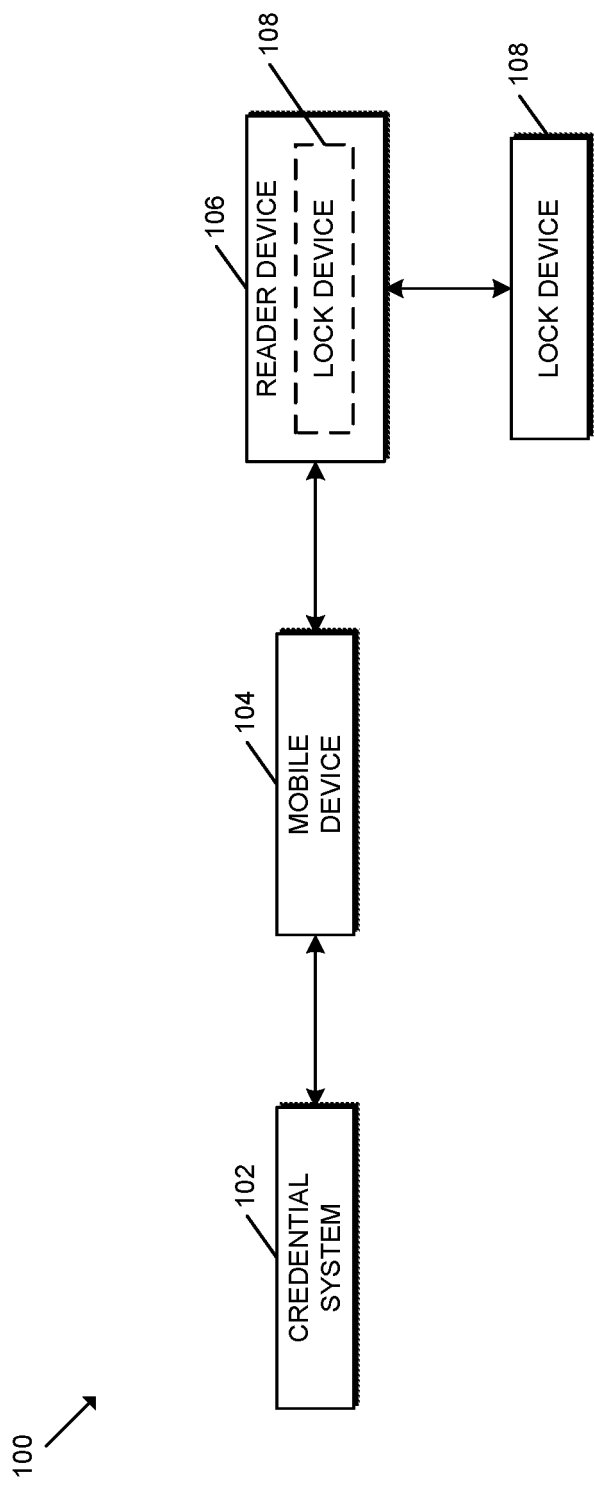
FIG. 1 is a simplified block diagram of at least one embodiment of an access control system for leveraging an access control architecture for detecting secure data copied between devices.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

It should be appreciated that the technologies described herein can be used to detect when secure data has been copied from an original device to another device and that other device attempts to deliver that data to a system while alleging the data to be its own. When copied data is detected, the system is able to reject the secure data (e.g., an access control device may deny access). In order to do so, the technologies rely on the use of two diversified keys (e.g., Kd1 and Kd2) that are generated based on some of the same diversification input data as well as some different diversification input data to create unique, yet linked, diversified keys. In some embodiments, one of the keys (e.g., Kd1) is stored in the original device (e.g., a mobile device) but the other key (e.g., Kd2) is never stored in that device. The Kd1 key diversification input data (e.g., Kd1_div) may be transmitted from the device (e.g., the mobile device) to the system (e.g., credential reader or access control device) during a device authentication phase, and the system may use the diversification input data (e.g., Kd1_div) to generate a corresponding diversification key (e.g., Kd1) and compute mutual authentication between the system and the device. When the device transfers the secure data to the system, it may also transfer a portion of the Kd2 key diversification input data (e.g., RND_Kd2), and the system may combine all or part of Kd1_div with the portion of the Kd2 key diversification input data (e.g., RND_Kd2) in generating the other key diversification input data (e.g., Kd2_div) to generate the diversification key (e.g., Kd2). After generation, the system may use the diversification key (e.g., Kd2) to authenticate the secure data with Kd2 to prove that the data originated in the system and was not transmitted by a secondary device. The system may then decrypt the secure data with Kd2 if the data was encrypted, for example, or potentially use a third diversified key (e.g., Kd3) to decrypt the secure data depending on the particular security architecture.

Referring now to FIG. 1, in the illustrative embodiment, an access control system 100 for leveraging an access control architecture for detecting secure data copied between devices is shown. The illustrative access control system 100 includes a credential system 102, a mobile device 104, a reader device 106, and a lock device 108.

It should be appreciated that the credential system 102, the mobile device 104, the reader device 106, and/or the lock device 108 may be embodied as any type of device or collection of devices suitable for performing the functions described herein. As described herein, the credential system 102 may be configured to create, manage, and/or distribute credentials of the access control system 100. For example, the credential system 102 may be responsible for maintaining and/or updating authorized credentials, accept lists, block lists, device parameters, and/or other relevant access control data. Additionally, in some embodiments, the credential system 102 may receive security data, audit data, raw sensor data, and/or other suitable data from the reader device 106 (e.g., via the mobile device 104) for management of the access control system 100. Further, in some embodiments, the management system 102 may manage credentials for multiple reader devices 106 at a single site (e.g., a particular building) and/or across multiple sites. It should be appreciated that the credential system 102 may include one or more devices depending on the particular embodiment of the access control system 100. For example, the credential system 102 may include one or more servers, gateway devices, access control panels, and/or mobile devices depending on the particular embodiment. In the illustrative embodiment, the credential system 102 is configured to communicate with the mobile device 104 via one or more wireless communication technologies. However, the credential system 102 may otherwise communicate with the mobile device 104 in other embodiments (e.g., via a wired connection).

It should be appreciated that, although the credential system 102 is described herein as one or more computing devices outside of a cloud computing environment, in other embodiments, the credential system 102 may be embodied as a cloud-based device or collection of devices. Further, in cloud-based embodiments, the credential system 102 may be embodied as a "serverless" or server-ambiguous computing solution, for example, that executes a plurality of instructions on-demand, contains logic to execute instructions only when prompted by a particular activity/trigger, and does not consume computing resources when not in use. That is, the credential system 102 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the credential system 102 described herein. For example, when an event occurs (e.g., data is transferred to the credential system 102 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to credential system 102), the appropriate virtual function(s) may be executed to perform the actions before eliminating the instance of the virtual function(s).

In the illustrative embodiment, the mobile device 104 may be embodied as any type of mobile device capable of communicating with the credential system 102 and the reader device 106 in order to perform the functions described herein. It should be appreciated that, in various embodiments, the mobile device 104 may be embodied as (or include) a "passive" credential device (without an independent power source) or "active" credential device (with an independent power source) depending on the particular device. For example, in the illustrative embodiment, the mobile device 104 is embodied as an "active" credential device such as a smartphone, powered dongle, and/or other mobile device. Accordingly, in some embodiments, it should be appreciated that the mobile device 104 may include wireless communication circuitry for communicating with the credential system 102, the reader device 106, and/or other devices via corresponding protocols (e.g., cellular communication protocols (GSM, GPRS, EDGE, UMTS, HSPA, CDMA, SMS, etc.), Wi-Fi, Bluetooth (e.g., including BLE), Zigbee, Z-Wave, Near Field Communication (NFC), Thread, ultra wideband (UWB), Matter, etc.). It should be appreciated that the mobile device 104 may be configured to communicate with the credential system 102 using one set of communication protocols (e.g., including cellular communication) and the reader device 106 using a different set of communication protocols (e.g., NFC) depending on the particular embodiment.

In other embodiments, the mobile device 104 may be embodied as a passive credential device having a credential identifier (e.g., a unique ID) stored therein and "passive" in the sense that the credential device is configured to be powered by radio frequency (RF) signals received from the reader device 106 and/or other device. In other words, such passive credentials do not have an independent power source but, instead, rely on power that is induced from RF signals transmitted from other devices in the vicinity of the credential. In particular, in some embodiments, one or more passive credentials may be embodied as a proximity card, which is configured to communicate over a low frequency carrier of nominally 125 kHz, and/or a smartcard, which is configured to communicate over a high frequency carrier frequency of nominally 13.56 MHz. In such embodiments, the mobile device 104 may be configured to communicate with both the credential system 102 and the reader device 106 via one or more near range communication technologies (e.g., NFC, etc.).

The reader device 106 may be embodied as any type of device capable of communicating with the mobile device 104 to receive credential data from the mobile device 104, to process the credential data, and/or to otherwise perform the functions described herein. For example, in the illustrative embodiment, the reader device 106 is configured to communicate with the mobile device 104 using NFC and/or other near range communication technologies. In some embodiments, the reader device 106 includes a Secure Access Module (SAM) and/or other secure processing module that is configured to execute various cryptographic functions and/or store cryptographic keys, diversification inputs, and/or other secure data.

Depending on the particular embodiment, the reader device 106 may be electrically/communicatively coupled to the lock device 108 and/or include the lock device 108. In other words, in some embodiments, the reader device 106 may be embodied as a standalone credential reader device that is electrically/communicatively coupled with a lock device 108, whereas in other embodiments, the reader device 106 may be embodied as an access control device that includes both a credential reader and a lock device 108. It should be appreciated that the access control decisions and/or processing may be performed (in full or in part) by the reader device 106 and/or the lock device 108 depending on the particular implementation.

The lock device 108 may be embodied as any type of device capable of controlling access through a passageway. For example, in various embodiments, the lock device 108 may be embodied as an electronic lock (e.g., a mortise lock, a cylindrical lock, or a tubular lock) or a peripheral controller of a passageway. In some embodiments, the lock device 108 includes a lock mechanism configured to control access through a passageway. For example, in some embodiments, the lock mechanism may be configured to be positioned in a locked state in which access to the passageway is denied, or positioned in an unlocked state in which access to the passageway is permitted. In some embodiments, the lock mechanism may include a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments.

It should be appreciated that each of the credential system 102, the mobile device 104, the reader device 106, and/or the lock device 108 may be embodied as one or more computing devices similar to the computing device 200 described below in reference to FIG. 2. For example, in the illustrative embodiment, each of the credential system 102, the mobile device 104, the reader device 106, and the lock device 108 includes a processing device 202 and a memory 206 having stored thereon operating logic 208 for execution by the processing device 202 for operation of the corresponding device.

Although only one credential system 102, one mobile device 104, one reader device 106, and one lock device 108 are shown in the illustrative embodiment of FIG. 1, the access control system 100 may include multiple credential systems 102, mobile devices 104, reader devices 106, and/or lock devices 108 in other embodiments. For example, as indicated above, the credential system 102 may be embodied as multiple servers in a cloud computing environment in some embodiments. Further, each user may be associated with one or more separate mobile devices 104 in some embodiments.

Figure 2:
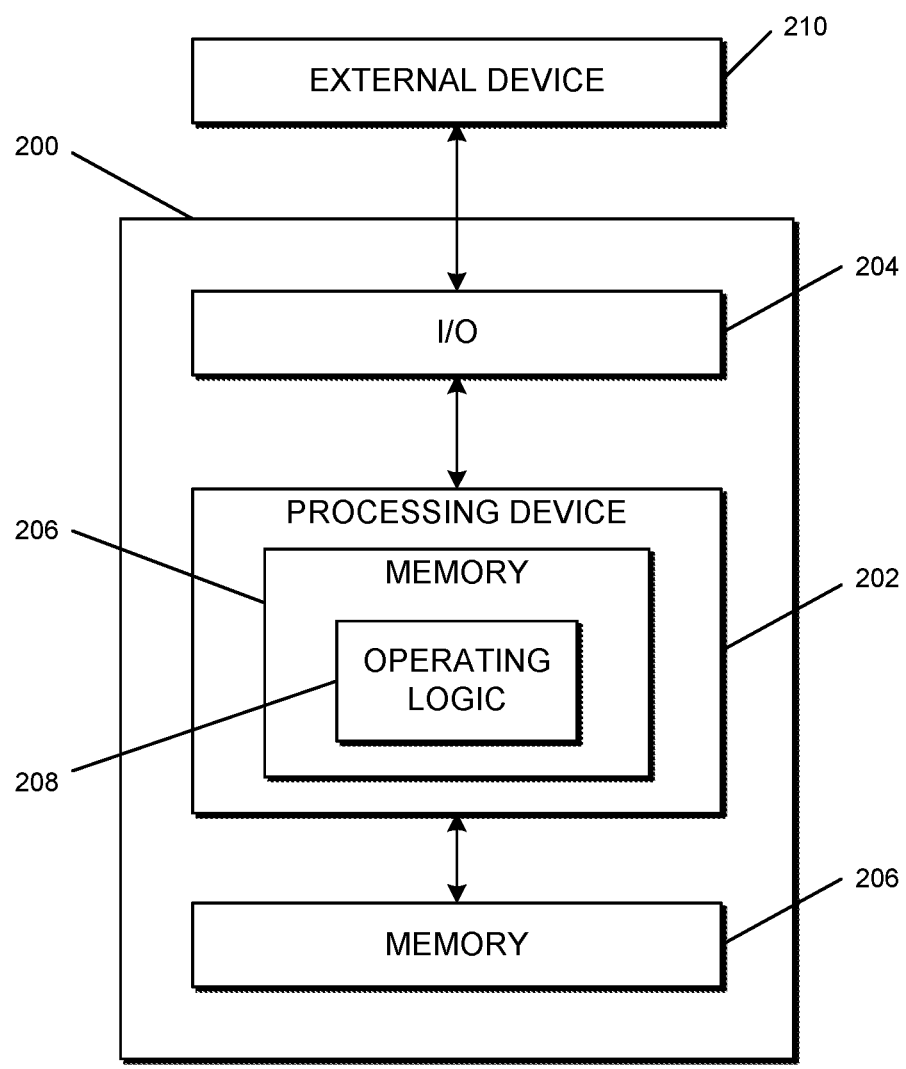
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of a credential system, mobile device, reader device, lock device, and/or access control device that may be utilized in connection with the credential system 102, the mobile device 104, the reader device 106, and/or the lock device 108 illustrated in FIG. 1. Depending on the particular embodiment, computing device 200 may be embodied as a reader device, credential device, access control device, lock device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, cellular, Zigbee, Z-Wave, NFC, Thread, UWB, Matter, etc.) to bring about such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the credential system 102, the mobile device 104, the reader device 106, and/or the lock device 108. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), Field Programmable Gate Array (FPGA), Complex Programmable Logic Device (CPLD), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
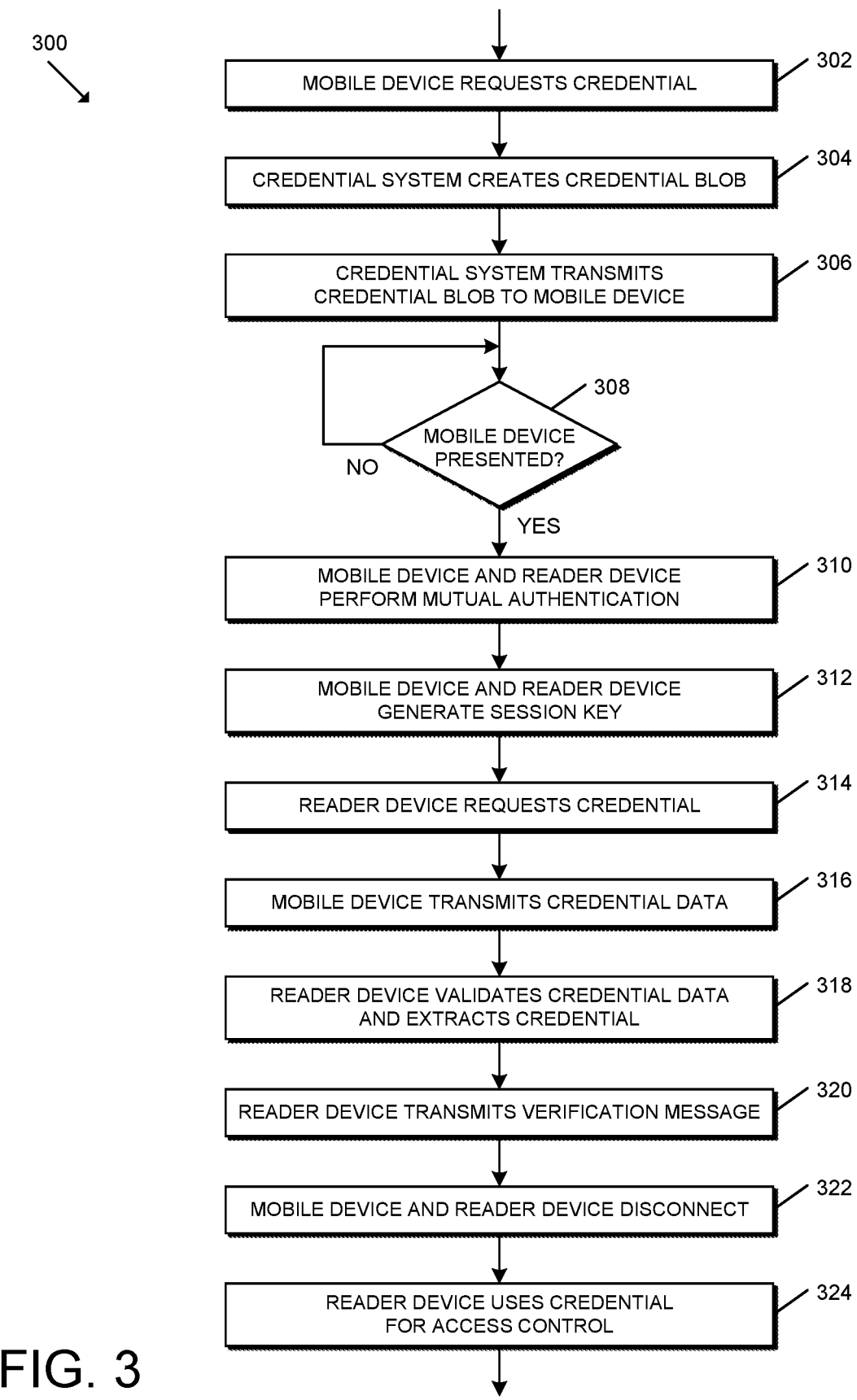
FIG. 3 is a simplified flow diagram of at least one embodiment of a method of leveraging an access control architecture for detecting secure data copied between devices.

Referring now to FIG. 3, in use, the access control system 100 may execute a method 300 of leveraging an access control architecture for detecting secure data copied between devices (e.g., between mobile devices 104). It should be appreciated that the particular blocks of the method 300 are illustrated by way of example, and such blocks may be combined or divided, added or removed, and/or reordered in whole or in part depending on the particular embodiment, unless stated to the contrary. In the illustrative embodiment, it should be appreciated that the method 300 assumes that the credential system 102 and the mobile device 104 have established a secure communication channel therebetween (e.g., via TLS and/or one or more other suitable technologies).

The illustrative method 300 begins with block 302 in which the mobile device 104 requests a credential from the credential system 102 for storage on the mobile device 104 and subsequent use, for example, unlocking the lock device 108 via authentication interactions with the reader device 106 as described below. In some embodiments, the request may be made via an HTTP POST message and/or another suitable communication with the credential system 102. In some embodiments, in executing block 302, the access control system 100 may execute flow 402 of the method 400 described below in reference to FIG. 4.

In block 304, the credential system 102 creates/generates a credential blob including the credential for the mobile device 104. In some embodiments, in executing block 304, the access control system 100 may execute flows 404-422 of the method 400 described below in reference to FIG. 4.

In block 306, the credential system 102 transmits the credential blob to the mobile device 306 (e.g., via a TLS or other secure communication connection). In some embodiments, the credential system 102 may transmit an HTTP 201 response indicating that the credential has been created on a server of the credential system 102 in response to the HTTP POST message and/or including the credential itself (e.g., in encrypted and/or signed form). It should be appreciated that the credential may be securely stored on the mobile device 104 (e.g., in the form of an encrypted credential blob) for subsequent use if/when the user presents the mobile device 104 to a reader device 106 for use. In some embodiments, in executing block 306, the access control system 100 may execute flow 424 of the method 400 described below in reference to FIG. 4.

If the access control system 100 (e.g., the reader device 106) determines, in block 308, that the mobile device 104 has been presented to the reader device 106 (e.g., for processing of the credential for an access control decision), the method 300 advances to block 310 in which the mobile device 104 and the reader device 106 perform mutual authentication to establish trust therebetween. In some embodiments, in executing block 308, the access control system 100 may execute flow 430 of the method 400 described below in reference to FIG. 5. Additionally, in some embodiments, in executing block 310, the access control system 100 may execute flows 432-460 of the method 400 described below in reference to FIG. 5.

In block 312, the mobile device 104 and the reader device 106 generate one or more session keys for secure communication therebetween (e.g., based on the data previously transmitted as part of the mutual authentication). In some embodiments, in executing block 312, the access control system 100 may execute flows 470-478 of the method 400 described below in reference to FIG. 6.

In block 314, the reader device 106 requests the credential from the mobile device 104. In some embodiments, in executing block 314, the access control system 100 may execute flow 480 of the method 400 described below in reference to FIG. 6.

In block 316, the reader device 106 transmits credential data to the mobile device 104. More specifically, in some embodiments, the mobile device 104 may transmit credential data (e.g., a credential blob) that includes the credential, which may be decrypted from the data blob, validated (e.g., via a keyed hash), and extracted for use by the reader device 106 and/or the lock device 108. In some embodiments, in executing block 316, the access control system 100 may execute flow 482 of the method 400 described below in reference to FIG. 6.

In block 318, the reader device 106 validates the credential data (e.g., using a keyed hash) and extracts the credential from the credential data blob. In some embodiments, in executing block 318, the access control system 100 may execute flows 490-508 of the method 400 described below in reference to FIG. 7.

In block 320, the reader device 106 may transmit a verification message to the mobile device 104 indicating that the credential has been successfully extracted from the credential blob. In some embodiments, in executing block 320, the access control system 100 may execute flows 510-512 of the method 400 described below in reference to FIG. 7.

In block 322, the mobile device 104 and the reader device 106 may disconnect, discontinue, and/or deselect a communication connection with one another. In some embodiments, in executing block 322, the access control system 100 may execute flows 514-516 of the method 400 described below in reference to FIG. 7.

In block 324, the reader device 104 uses the credential for an access control purpose or otherwise. For example, in some embodiments, the reader device 104 may transmit the credential to the lock device 108 for further processing, and/or transmit an instruction to the lock device 108 to perform one or more actions (e.g., unlock a lock mechanism of the lock device 108). In some embodiments, in executing block 324, the access control system 100 may execute flow 518 of the method 400 described below in reference to FIG. 7.

Although the blocks 302-324 are described in a relatively serial manner, it should be appreciated that various blocks of the method 300 may be performed in parallel in some embodiments.

Referring now to FIGS. 4-7, in use, the access control system 100 may execute a method 400 of leveraging an access control architecture for detecting secure data copied between devices (e.g., between mobile devices 104). It should be appreciated that the particular flows of the method 400 are illustrated by way of example, and such flows may be combined or divided, added or removed, and/or reordered in whole or in part depending on the particular embodiment, unless stated to the contrary. In the illustrative embodiment, it should be appreciated that the method 400 assumes that the credential system 102 and the mobile device 104 have established a secure communication channel therebetween (e.g., via TLS and/or one or more other suitable technologies). The method 400 also assumes that a master cryptographic key (Km) is securely stored in the credential system 102 and was previously provisioned (e.g., in the factory or subsequently) to the reader device 106 (e.g., stored in secure data storage of the reader device 106). Further, as described below, it should be appreciated that some embodiments may utilize a privacy key (Kp). In such embodiments, the method 400 also assumes that the privacy key (Kp) is likewise securely stored in the credential system 102 and previously provisioned to the reader device 106.

Figure 4:
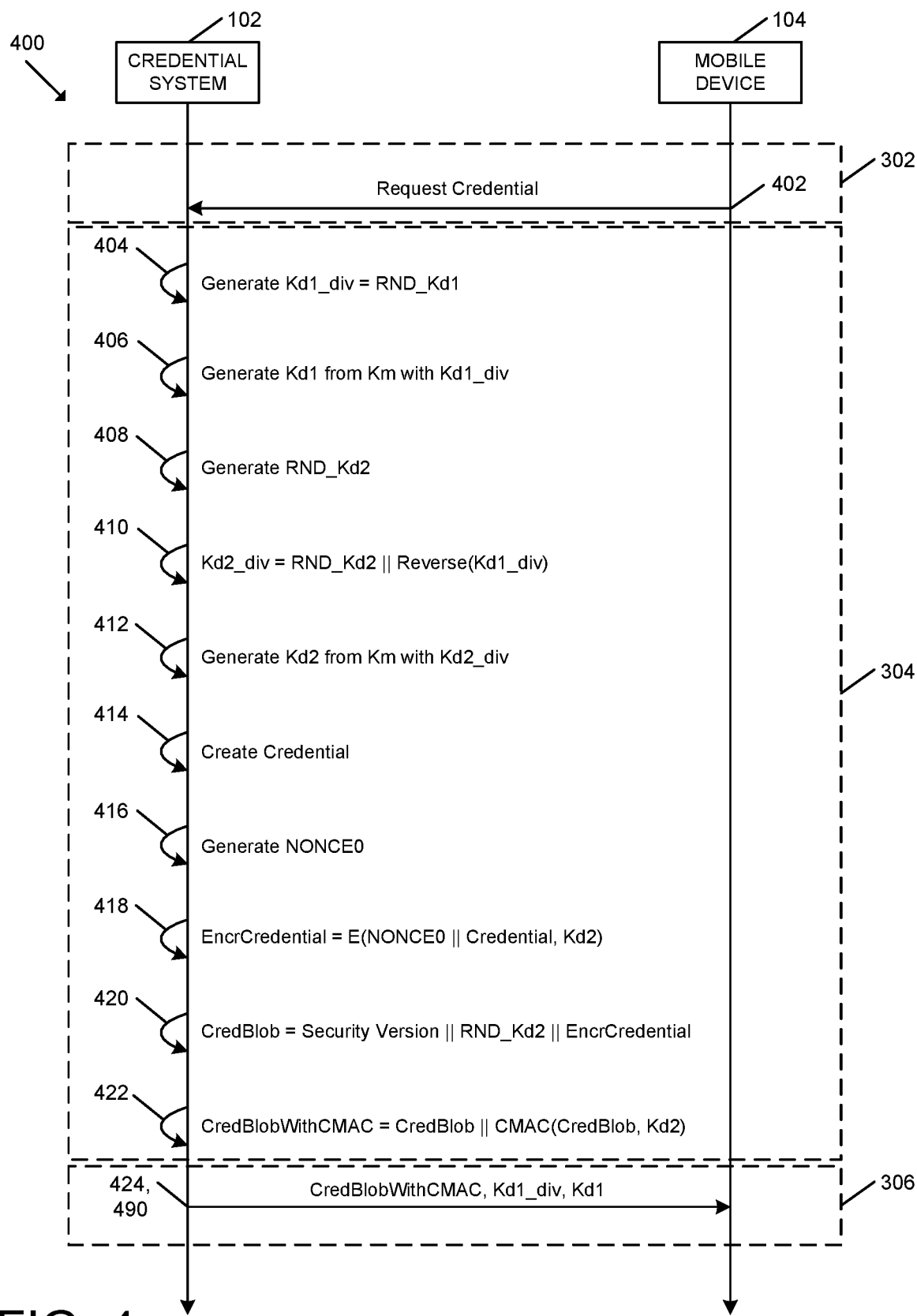
FIGS. 4-7 are a simplified flow diagram of at least one embodiment of a method of leveraging an access control architecture for detecting secure data copied between devices.

The illustrative method 400 begins with flow 402 of FIG. 4 in which the mobile device 104 requests a credential from the credential system 102 for storage on the mobile device 104 and subsequent use, for example, unlocking the lock device 108 via authentication interactions with the reader device 106 as described below. In some embodiments, the request may be made via an HTTP POST message transmitted to the credential system 102.

In flow 404, the credential system 102 generates a random number (Kd1_div=RND_Kd1). As described in further detail below, the random number (Kd1_div) may be used as a key diversification input for a cryptographic key (Kd1). In some embodiments, the random number (Kd1_div) is a 16-byte random number; however, the random number may be otherwise sized in other embodiments. It should be appreciated that, in various embodiments, the random numbers generated in execution of the method 400 may be generated using a random number generator, pseudorandom number generator, and/or another suitable random number/value generator depending on the particular embodiment. For example, in some embodiments, one or more of the random numbers described herein may be generated by a cryptographically secure random number generator in accordance with the FIPS 140-2 specification. Although described herein as being random "numbers" for simplicity and brevity of the description, it should be appreciated that one or more of the random numbers generated and/or used herein may be a non-numerical value in some embodiments. Further, in other embodiments, it should be appreciated that the random number may be replaced with another value suitable for performing the functions described herein (e.g., a monotonically increasing positive integer, timestamp, etc.).

In flow 406, the credential system 102 generates a cryptographic key (Kd1) from the master key (Km) using the key diversification input (Kd1_div). For example, in the illustrative embodiment, the credential system 102 generates the cryptographic key (Kd1) using a cipher-based message authentication code (CMAC) of the key diversification input (Kd1_div) (and potentially other data) with the master key (Km) as a key (e.g., to generate a 16-byte signature of data calculated with the specified key). However, it should be appreciated that the cryptographic key (Kd1) may be generated using a simple key derivation function (KDF), Hash-based message authentication code (HMAC) with SHA-256, HMAC-Based Key Derivation Function (HKDF), or another suitable key generation algorithm.

In flow 408, the credential system 102 generates another random number (RND_Kd2). In some embodiments, the random number (RND_Kd2) is an 8-byte random number; however, the random number may be otherwise sized in other embodiments. In flow 410, the credential system 102 generates a second key diversification input (Kd2_div) for a second cryptographic key (Kd2) that is to be generated. In the illustrative embodiment, the second key diversification input (Kd2_div) is generated according to Kd2_div=RND_Kd2∥Reverse(Kd1_div), where is indicative of concatenation of the data and Reverse(Kd1_div) is a function that involves reversing the byte order of Kd1_div. In other embodiments, however, it should be appreciated that the Reverse( ) function may involve reversing the bits of Kd1_div or otherwise shuffling the data of Kd1_div in a predefined manner. In yet another embodiment, the Reverse( ) function may be omitted (e.g., or replaced with the identity function). Additionally, in other embodiments, it should be appreciated that data described in the method 400 as being grouped together via concatenation may be otherwise grouped or structured depending on the particular embodiment.

In flow 412, the credential system 102 generates a cryptographic key (Kd2) from the master key (Km) using the key diversification input (Kd2_div). For example, in the illustrative embodiment, the credential system 102 generates the cryptographic key (Kd2) using a CMAC of the key diversification input (Kd2_div) (and potentially other data) with the master key (Km) as a key (e.g., to generate a 16-byte signature of data calculated with the specified key). However, it should be appreciated that the cryptographic key (Kd2) may be generated using a KDF, HMAC with SHA-256, HKDF, or another suitable key generation algorithm in other embodiments. It should be appreciated that the cryptographic key (Kd1) may be described herein as an authentication diversified key (Km diversified with Kd1_div), and the cryptographic key (Kd2) may be described herein as an encryption diversified key (Km diversified with Kd2_div).

In flow 414, the credential system 102 creates/generates a credential for the mobile device 104. As described herein, in the illustrative embodiment, the credential is an access credential that may be used to gain access to a passageway secured by the lock device 108. However, it should be appreciated that that credential may be used for other types of access in other embodiments. Further, although the credential is described herein as being created by the credential system 102, in other embodiments, it should be appreciated that the credential may be created by a different entity and securely transmitted to the credential system 102 (and/or securely transmitted directly to the mobile device 104 on behalf of the credential device 102).

In flow 416, the credential system 102 generates a nonce (NONCE0). In the illustrative embodiment, each nonce described herein is a random number; however, it should be appreciated that, in some embodiments, the nonce may be recorded to ensure that it is not subsequently used (e.g., for a threshold period of time). Further, in some embodiments, each nonce described herein may be embodied as a 16-byte random number.

In flow 418, the credential system 102 encrypts the credential and the nonce (NONCE0) using the encryption diversified key (Kd2). For example, the encrypted credential may be generated according to EncrCredential=E(NONCE0∥Credential, Kd2). In the illustrative embodiment, the encryption diversified key (Kd2) is a symmetric cryptographic key such that a symmetric encryption algorithm is used to encrypt the credential. It should be appreciated that the nonce may be used to mitigate or eliminate the possibility of replay attacks. In another embodiment, it should be appreciated that an initialization vector (IV) may be used in addition to, or in the alternative to, the nonce (NONCE0) described herein. In yet another embodiment, a value or sequence of values used to derive an initialization vector via a suitable algorithm may be used and/or transmitted.

In flow 420, the credential system 102 generates a credential blob including the encrypted credential, the security version of the credential, and the random number (RND_Kd2) used in generating the key diversification input (Kd2_div) for the encryption diversified key (Kd2). For example, the credential blob may be generated according to CredBlob=Security Version∥RND_Kd2∥EncrCredential. In the illustrative embodiment, the security version of the credential is a 1-byte value indicating the security version of the credential. It should be appreciated that, in the illustrative embodiment, the credential blob includes the random number (RND_Kd2) rather than the key diversification input (Kd2_div) itself so as to connect the encryption diversified key (Kd2) with the authentication diversified key (Kd1) via the authentication key diversification input (Kd1_div) transmitted in flow 440. It should be further appreciated that, by not supplying the entire encryption diversification input (Kd2_div) within the credential blob and by transmitting the authentication key diversification input (Kd1_div) to the reader device 106 only once during flow 440, the reader device 106 is able to verify that the credential blob with the keyed hash received in flow 482 is paired with the authentication diversified key (Kd1) generated in flow 442.

In flow 422, the credential system 102 generates a keyed hash of the credential blob based on the encryption diversified key (Kd2) for transmittal to the mobile device 104 along with the credential blob. More specifically, in the illustrative embodiment, the credential system 102 generates a CMAC of the credential blob using the encryption diversified key (Kd2). For example, the credential blob and hash may be formed according to CredBlobWithCMAC=CredBlob∥CMAC(CredBlob, Kd2). Although the encryption diversified key (Kd2) is used in the illustrative embodiment to both encrypt the credential and also generate the CMAC of the credential blob, it should be appreciated that a different cryptographic key (i.e., different from both Kd1 and Kd2) may be used to either encrypt the credential or generate the CMAC of the credential blob in other embodiments.

In flow 424, the credential system 102 transmits the credential blob with the keyed hash (e.g., CredBlobWithC-MAC), the authentication diversified key (Kd1), and the diversification input (Kd1_div) for the authentication diversified key (Kd1) to the mobile device 104. As described above, it should be appreciated that such data may be transmitted from the credential system 102 to the mobile device 104 via a secure communication connection. Further, in some embodiments, the credential system 102 may transmit the data in conjunction with an HTTP 201 response to an HTTP POST message received from the mobile device 104 requesting creation of the credential. It should be appreciated that the data may be securely stored on the mobile device 104 for subsequent use if/when the user presents the mobile device 104 to a reader device 106 for use. In embodiments leveraging the privacy key (Kp), it should be appreciated that flow 424 may be replaced with flow 490 in which the credential system 102 transmits the credential blob with the keyed hash (e.g., CredBlobWithC-MAC), the authentication diversified key (Kd1), the diversification input (Kd1_div) for the authentication diversified key (Kd1), and the privacy key (Kp) to the mobile device 104.

Figure 5:
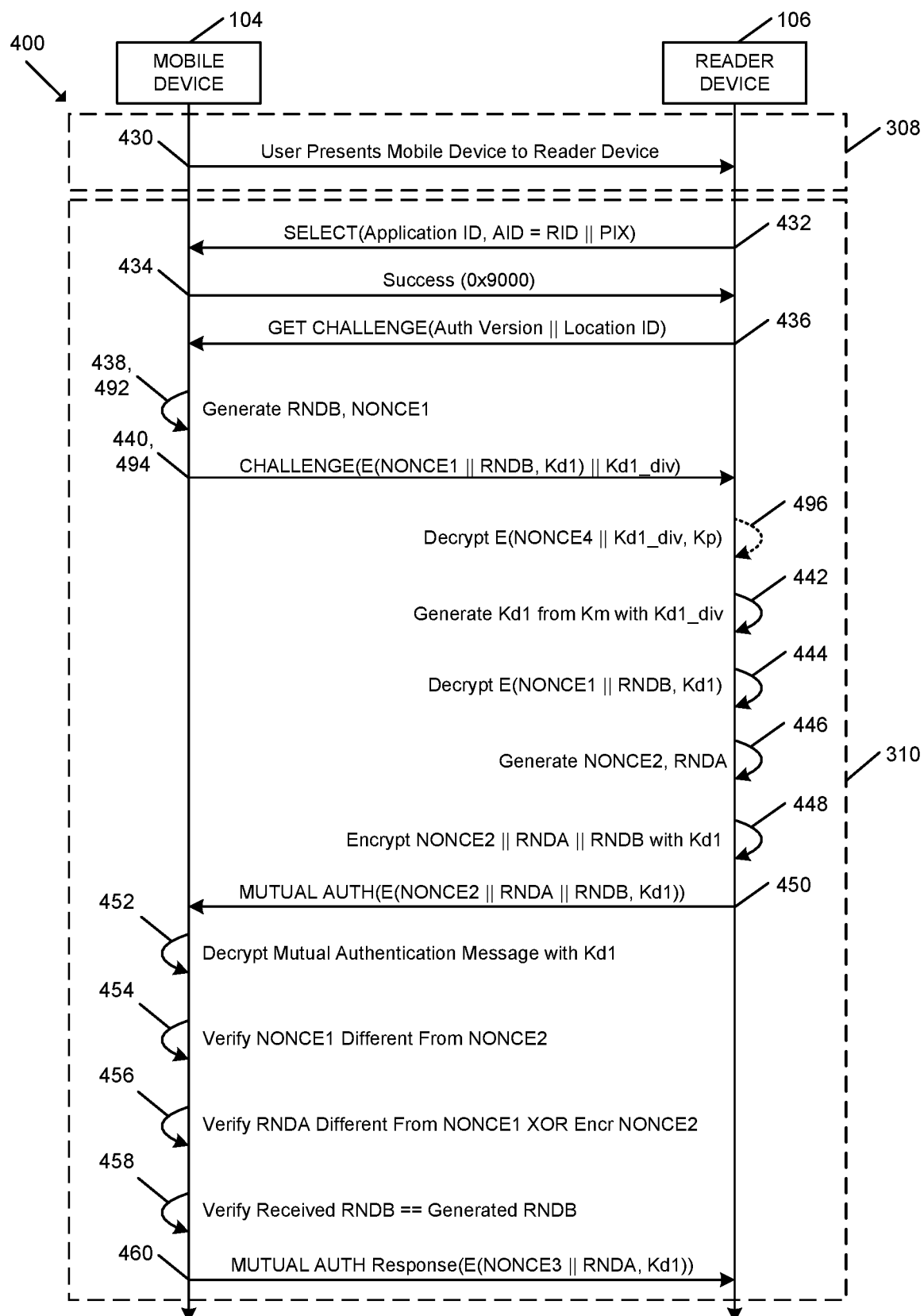

In flow 430 of FIG. 5, the mobile device 104 is presented to the reader device 106 by a user. For example, in some embodiments, the user of the mobile device 104 may present the mobile device 104 to the reader device 106 in order to gain access to a passageway secured by the lock device 108.

It should be appreciated that at least flows 432-434 are associated with NFC-related communication standards. Accordingly, in embodiments involving a communication protocol different from NFC (e.g., BLE), it should be appreciated that those flows may be omitted and/or replaced with other protocol-specific processes (e.g., related to the pairing of devices). In flow 432, the reader device 106 transmits a message to the mobile device 104 that identifies an application identifier from the configuration of the reader device 106. More specifically, in the illustrative embodiment, the reader device 106 transmits a message to the mobile device 104 according to SELECT(Application ID, AID=RID∥PIX), where AID is the Application ID from the reader configuration (RID∥PIX), RID is the ISO/IEC 7816-5 Registered Application Provider Identifier, and PIX is the proprietary extension. In flow 434, the mobile device 104 responds to the reader device 106 with a message (Success (0x9000)).

In flow 436, the reader device 106 transmits a message to the mobile device 104 to request a challenge for mutual authentication of the mobile device 104 and the reader device 106. In particular, in the illustrative embodiment, the reader device 106 transmits a message to the mobile device 104 according to GET CHALLENGE(Auth Version∥Location ID), where Auth Version is the mutual authentication protocol version to be used (e.g., a 1-byte value), and Location ID is an identification number from the reader configuration used to select a credential within an application (e.g., a 3-byte value). It should be appreciated that the Auth Version data may be used to identify, for example, whether the privacy key (Kp) is being used.

In flow 438, the mobile device 104 generates a random number (RNDB) and a nonce (NONCE1). In some embodiments, the random number (RNDB) is a 16-byte random number; however, the random number may be otherwise sized in other embodiments. In embodiments leveraging the privacy key (Kp), it should be appreciated that flow 438 may be replaced with flow 494 in which the mobile device 104 generates a random number (RNDB), a nonce (NONCE1), and another nonce (NONCE4).

In flow 440, the mobile device 104 encrypts the random number (RNDB) and the nonce (NONCE1) using the authentication diversified key (Kd1), and transmits a challenge message to the reader device 106 including the encrypted data and the key diversification input (Kd1_div) used to generate the authentication diversified key (Kd1) to the reader device 106. For example, in the illustrative embodiment, the mobile device 104 transmits a challenge message to the reader device 106 according to CHAL-LENGE(E(NONCE1∥RNDB, Kd1)∥Kd1_div). In embodiments leveraging the privacy key (Kp), it should be appreciated that flow 440 may be replaced with flow 494 in which the mobile device 104 encrypts the random number (RNDB) and one nonce (NONCE1) using the authentication diversified key (Kd1), encrypts the other nonce (NONCE4) and the key diversification input (Kd1_div) used to generate the authentication diversified key (Kd1) using the privacy key (Kp), and transmits a challenge message including the encrypted data to the reader 106. For example, the mobile device 104 may transmit a challenge message to the reader device 106 according to CHALLENGE(E(NONCE1∥RNDB, Kd1)∥E(NONCE4∥Kd1_div, Kp)). Additionally, embodiments leveraging the privacy key (Kp) may include flow 496 in which the reader device 106 decrypts the encrypted data E(NONCE4∥Kd1_div, Kp) received from the mobile device 104 using the privacy key (Kp) previously provisioned to the reader device 106, and the reader device 106 extracts the key diversification input (Kd1_div) from the decrypted data.

In flow 442, the reader device 106 generates the authentication diversified key (Kd1) from the master key (Km) securely stored on the reader device 106 and the key diversification input (Kd1_div) received from the reader device 106. In doing so, it should be appreciated that the reader device 106 may utilize the same cryptographic protocol(s) used by the credential system 102 to generate the authentication diversified key (Kd1) as described above.

In flow 444, the reader device 106 decrypts the encrypted data (E(NONCE1∥RNDB, Kd1)) received from the mobile device 104 using the authentication diversified key (Kd1)), and the reader device 106 extracts the random number (RNDB) from the decrypted data.

In flow 446, the reader device 106 generates a random number (RNDA). In some embodiments, the random number (RNDA) is a 16-byte random number; however, the random number may be otherwise sized in other embodiments. Further, in the illustrative embodiment, the reader device 106 also generates a 16-byte nonce (NONCE2) and generates a 32-byte random number by combining the random number (RNDA) and the nonce (NONCE2) according to NONCE2∥RNDA.

In flow 448, the reader device 106 combines (e.g., concatenates) the 32-byte random number with the random number (RNDB) received from the mobile device 104 (e.g., NONCE2∥RNDA∥RNDB) and encrypts the combined (e.g., concatenated) data using the authentication diversified key (Kd1). In flow 450, the reader device 106 transmits a mutual authentication message to the mobile device 104 including the encrypted data (e.g., E(NONCE2∥RNDA∥RNDB, Kd1)).

In flow 452, the mobile device 104 decrypts the mutual authentication message received from the reader device 106 using the authentication diversification key (Kd1) and extracts the data. In flow 454, the mobile device 104 evaluates the extracted nonce (NONCE2) to verify that the extracted nonce differs from the nonce (NONCE1) that was transmitted to the reader device 106. In some embodiments, in flow 456, the mobile device 104 also evaluates the extracted random number (RNDA) is different from NONCE1 XOR Encrypted NONCE2. In flow 458, the mobile device 104 evaluates the random number (RNDB) received from the reader device 106 to verify that the received random number (RNDB) is equal to the corresponding random number (RNDB) that was initially generated by the mobile device 104. If the verifications are successful, it should be appreciated that the mobile device 104 may treat the reader device 106 as being authenticated.

Accordingly, in flow 460, the mobile device 104 generates a nonce (NONCE3), encrypts the random number (RNDA) and the nonce (NONCE3) using the authentication diversified key (Kd1), and transmits a mutual authentication response message including the encrypted data to the reader device 106. For example, in the illustrative embodiment, the mobile device 104 transmits a mutual authentication response message to the reader device 106 according to MUTUAL AUTH Response(E(NONCE3 RNDA, Kd1)).

Figure 6:
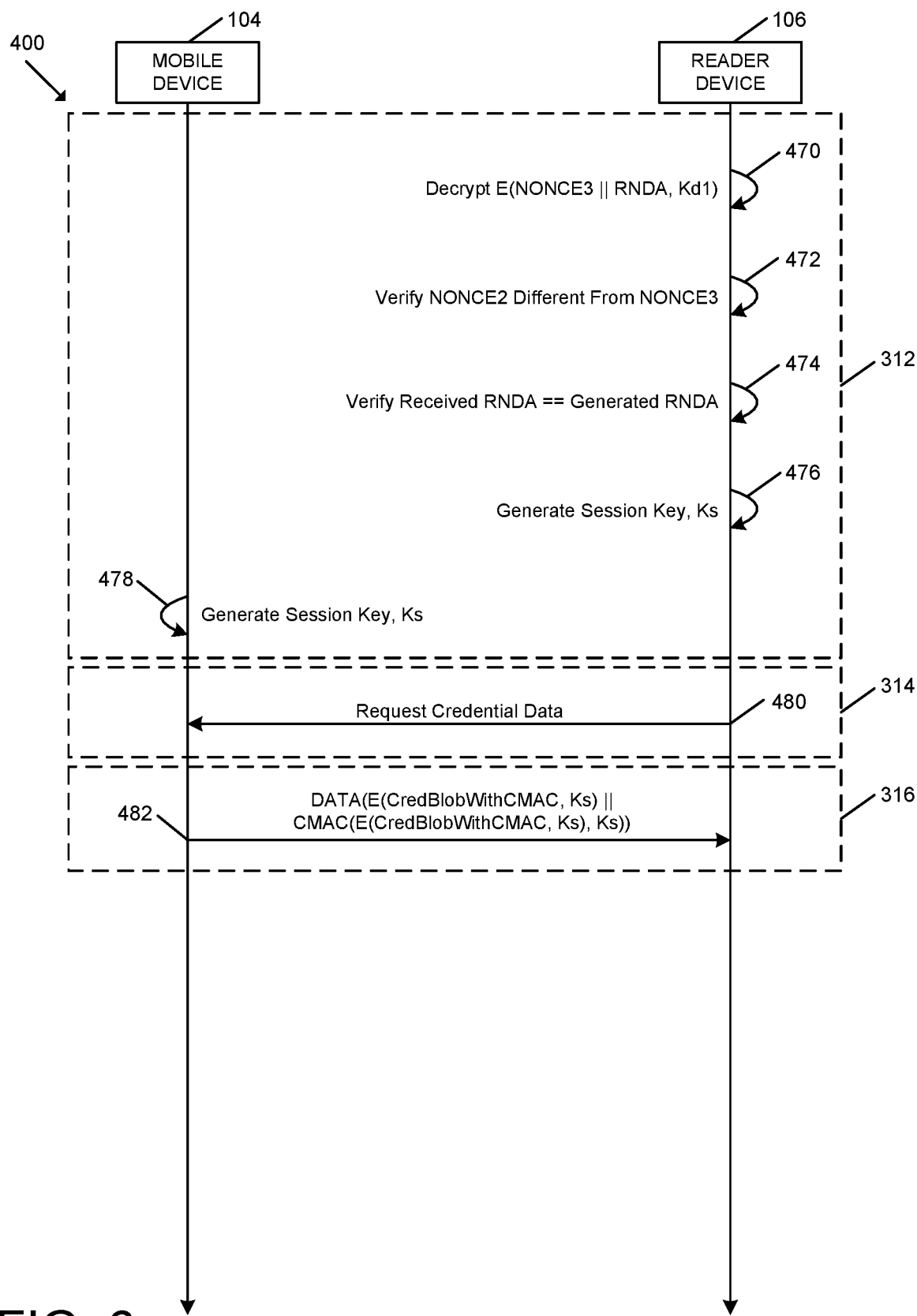

In flow 470 of FIG. 6, the reader device 106 decrypts the mutual authentication response message received from the mobile device 104 using the authentication diversification key (Kd1) and extracts the data. In flow 472, the reader device 106 evaluates the extracted nonce (NONCE3) to verify that the extracted nonce differs from the nonce (NONCE2) that was transmitted to the mobile device 104. In flow 474, the reader device 106 evaluates the random number (RNDA) received from the mobile device 104 to verify that the received random number (RNDA) is equal to the corresponding random number (RNDA) that was initially generated by the reader device 108. If the verifications are successful, it should be appreciated that the reader device 106 may treat the mobile device 104 as being authenticated. In other words, at this point, there is mutual authentication between the mobile device 104 and the reader device 106.

In flow 476, the reader device 106 generates a session key (Ks) based on the random numbers (RNDA and RNDB) exchanged between the mobile device 104 and the reader device 106 during the mutual authentication described above. Similarly, in flow 478, the mobile device 104 also generates a session key (Ks) based on the random numbers (RNDA and RNDB) exchanged between the mobile device 104 and the reader device 106. In the illustrative embodiment, the session key (Ks) is generated according to RNDA [0:3]∥RNDB[4:7]∥RNDA [8:11]∥RNDB[12:15], where RNDA[X:Y] is bytes X through Y of the random number (RNDA) and RNDB[N:M] is bytes N through M of the random number (RNDB). However, it should be appreciated that session key may be generated using another algorithm and/or technique in other embodiments. For example, in some embodiments, the session key may be generated according to RNDA XOR RNDB. Further, in some embodiments, it should be appreciated that the mobile device 104 and the reader device 106 may generate multiple session keys based on the random numbers.

In flow 480, the reader device 106 transmits a message to the mobile device 104 to request the credential from the mobile device 104. In flow 482, the mobile device 104 encrypts the credential blob with the keyed hash (e.g., CredBlobWithCMAC) using the session key (Ks), generates another keyed hash (e.g., CMAC) of the encrypted data also using the session key (Ks), and transmits the encrypted data and keyed hash to the reader device 106. For example, in some embodiments, the mobile device 104 may transmit credential data to the reader device 106 according to DATA (E(CredBlobWithCMAC, Ks)∥CMAC(E(CredBlobWithCMAC, Ks), Ks)). Although the illustrative embodiment involves using the same session key (Ks) to encrypt the data and generate the keyed hash, it should be appreciated that one session key may be used to encrypt the data and another session key may be used to generate the keyed hash in other embodiments.

Figure 7:
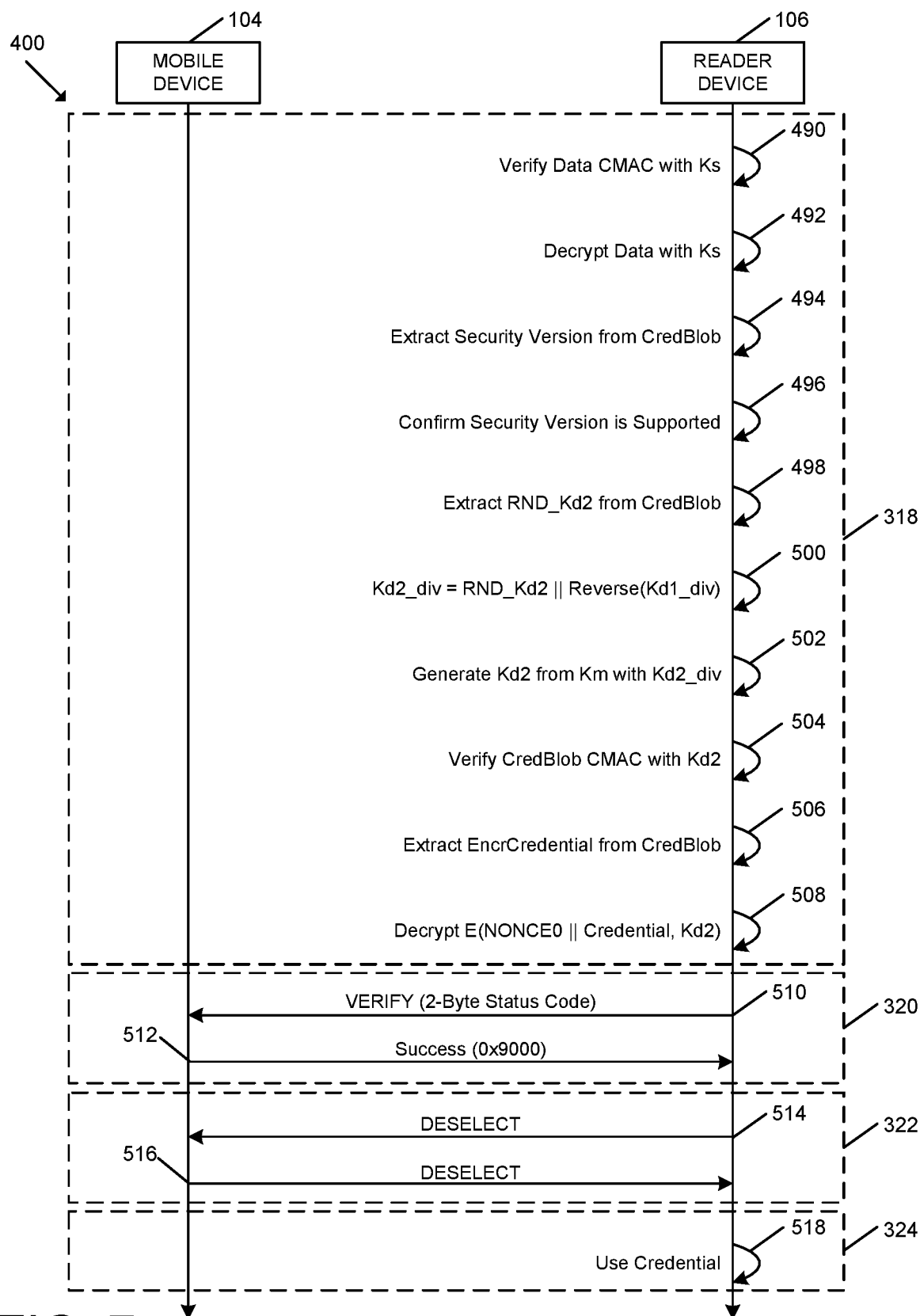

In flow 490 of FIG. 7, the reader device 106 evaluates the credential data received from the mobile device 104 to verify the keyed hash of the encrypted data using the session key (Ks). For example, in the illustrative embodiment, the reader device 106 generates a CMAC of the encrypted data received from the mobile device 104 using the session key (Ks) and compares the generated CMAC to the CMAC received from the mobile device 104 along with the encrypted data.

Assuming the keyed hashes match, in flow 492, the reader device 106 decrypts the data received from the mobile device 104 using the session (Ks). It should be appreciated that the reader device 106 uses the same/corresponding cryptographic encryption/decryption algorithm to decrypt that was used by the mobile device 104 to encrypt the data. Further, as indicated above, in some embodiments, a different session key may be used to verify the keyed hash (e.g., the CMAC) than the session key used to encrypt/decrypt the data. Accordingly, in some embodiments, the reader device 106 may decrypt the data received from the mobile device 104 using the appropriate corresponding session key. In flow 494, the reader device 106 extracts the security version of the credential from the decrypted data (e.g., from CredBlobWithCMAC), and in flow 496, the reader device 106 confirms that the security version of the credential is supported by the reader device 106.

Assuming the credential version is supported, in flow 498, the reader device 106 extracts the random number (RND_Kd2) from the decrypted credential blob (or, more specifically, from the CredBlobWithCMAC). In flow 500, the reader device 108 calculates key diversification input (Kd2_div) for the encryption diversified key (Kd2) based on the extracted random number (RND_Kd2) and the key diversification input (Kd1_div) for the authentication diversified key (Kd1). In particular, in the illustrative embodiment, the key diversification input (Kd2_div) for the encryption diversified key (Kd2) is generated according to Kd2_div=RND_Kd2∥Reverse (Kd1_div). Accordingly, it should be appreciated that the reader device 106 utilizes the same algorithm as was used by the credential system 102 to initially generate the key diversification input (Kd2_div) for the encryption diversified key (Kd2). As such, the reader device 106 may utilize a different algorithm for generating the key diversification input (Kd2_div), such as, for example, by replacing or modifying the Reverse( ) function to correspond with the algorithm utilized by the credential system 102.

In flow 502, the reader device 106 generates the encryption diversified key (Kd2) from the master key (Km) using the diversification key input (Kd2_div). It should be appreciated that the reader device 106 utilizes the same algorithm as was used by the credential system 102 to initially generate the encryption diversified key (Kd2). For example, in the illustrative embodiment, the reader device 106 generates the encryption diversified key (Kd2) using a CMAC of the key diversification input (Kd2_div) (and potentially other data) with the master key (Km) as a key (e.g., to generate a 16-byte signature of data calculated with the specified key).

In flow 504, the reader device 106 evaluates the keyed hash of the credential blob (e.g., CredBlob) to verify the keyed hash of the credential blob using the encryption diversified key (Kd2). For example, in the illustrative embodiment, the reader device 106 generates a CMAC of the credential blob received from the mobile device 104 using the encryption diversified key (Kd2) and compares the generated CMAC to the CMAC received from the mobile device 104 (e.g., as the CredBlobWithCMAC).

Assuming the keyed hashes match, in flow 506, the reader device 106 extracts the encrypted credential from the credential blob and, in flow 508, the reader device 106 decrypts the encrypted credential using the encryption diversified key (Kd2). It should be appreciated that the reader device 106 uses the same/corresponding cryptographic encryption/decryption algorithm to decrypt that was used by the credential system 102 to encrypt the credential.

In flow 510, the reader device 106 transmits a verification message to the mobile device 104 indicating that the credential was successful decrypted and, in flow 512, the mobile device 104 responds to the reader device 106 with an acknowledgement message (Success(0x9000)).

As described above, in some embodiments, the mobile device 104 and the reader device 106 may communicate with one another via NFC. Accordingly, in flow 514, the reader device 106 may transmit an NFC DESELECT message to the mobile device 104 and, in flow 516, the mobile device 104 may transmit an NFC DESELECT message to the reader device 106. In other embodiments, the mobile device 104 and the reader device 106 may otherwise disconnect or discontinue the communication connection therebetween.

In flow 518, the reader device 104 uses the credential for an access control purpose or otherwise. For example, in some embodiments, the reader device 104 may transmit the credential to the lock device 108 for further processing, and/or transmit an instruction to the lock device 108 to perform one or more actions (e.g., unlock a lock mechanism of the lock device 108).

Although the flows 402-518 are described in a relatively serial manner, it should be appreciated that various blocks of the method 400 may be performed in parallel in some embodiments.

Although the methods 300, 400 of FIGS. 3-7 describe the use of a single master key (Km), it should be appreciated that multiple master keys (e.g., Km1 and Km2) may be used in some embodiments. For example, in some embodiments, one of the master keys (e.g., Km1) may be used to create the authentication diversified key (Kd1) and the other master key (e.g., Km2) may be used to create the encryption diversified key (Kd2). In such embodiments, the credential system 102 and the reader device 106 may store both master keys in a manner similar to that described herein. It should be appreciated that such features protect from an attack on the system if one master key is compromised. In some embodiments, to further protect the master keys, one of the master keys may be stored in one storage (e.g., a cloud server storage) and the other master key may be stored in another storage (e.g., another cloud server storage).

Figure 8:
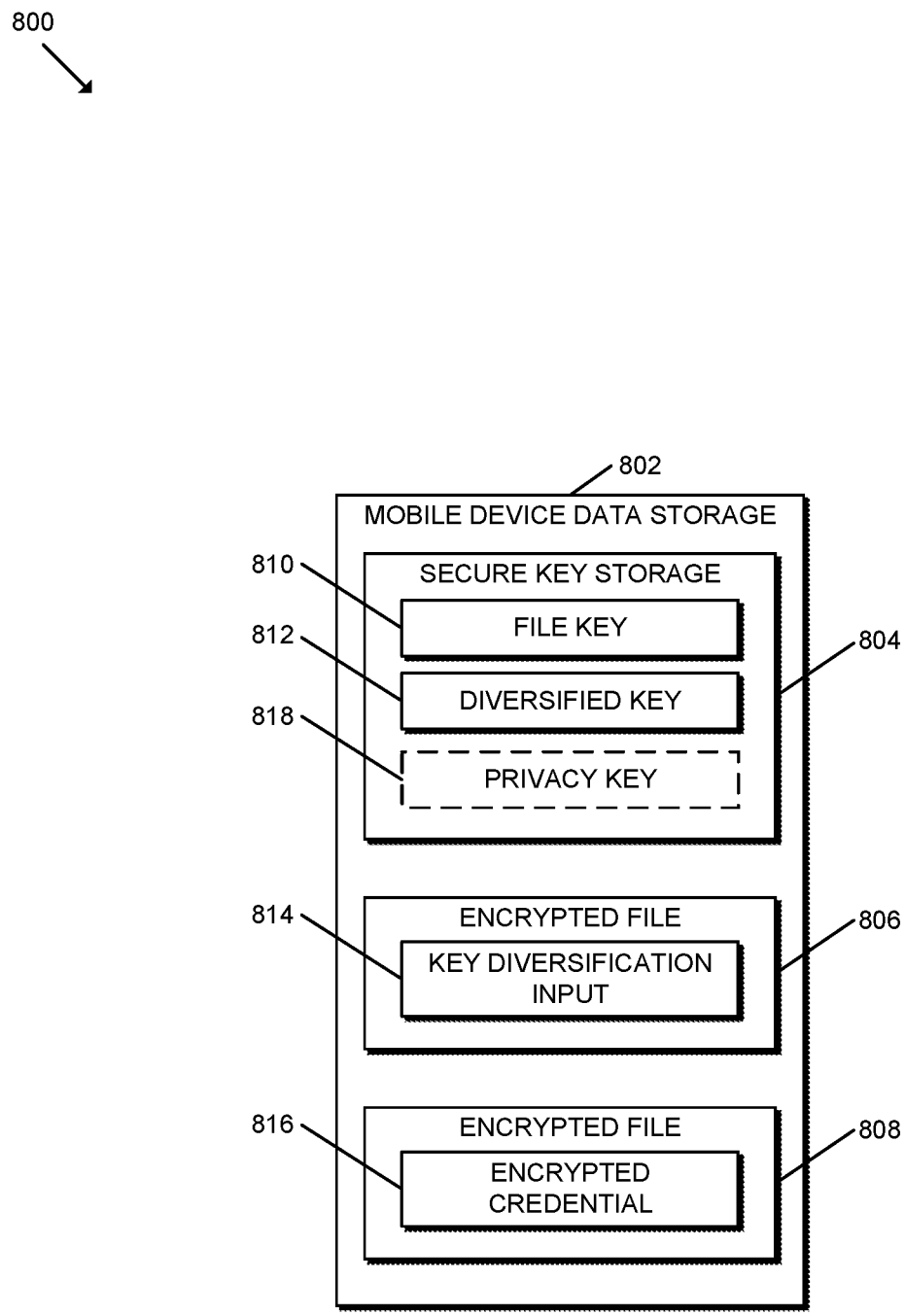
FIG. 8 is a simplified block diagram of at least one embodiment of a secure data storage architecture.

Referring now to FIG. 8, a secure data storage architecture 800 for the mobile device 104 may include a secure key storage 804 and encrypted files 806, 808. As shown, the secure key storage 804 may securely store a file key 810 that can be used to encrypt/decrypt files stored in the data storage and a diversified key 812 as described above. It should be appreciated that, in some embodiments, the file key 810 is only accessible by the mobile device application that generated the corresponding file. In the illustrative embodiment, the secure data storage architecture 800 includes a file 806 that has been encrypted with the file key 810 and that includes a key diversification input 814 as described above, and the secure data storage architecture 800 further includes a file 808 that has also been encrypted with the file key 810 and that includes an encrypted credential 816 as described above. In other words, the illustrative secure data storage architecture 800 allows for the key diversification input 814 and the encrypted credential 816 to both be encrypted and also storage separately from one another. Additionally, the diversified key 812 may be stored in a secure element or other secure key storage that is separate from both the key diversification input 814 and the encrypted credential 816. As such, if there is a security breach by which one of the pieces of data is captured, the security is maintained. For example, if a malicious actor copies another user's credential, the actor is unable to use that credential to gain access, even if that actor can be authenticated by the reader device 106 based on his or her own diversification key or access rights. Additionally, in embodiments using a privacy key (Kp) as described above, the privacy key 818 (Kp) may also be stored in the secure key storage 804.

What is claimed is:

1. A method for leveraging an access control architecture for detecting secure data copied between devices in an access control system that includes a credential system, a mobile device, and a reader device, the method comprising:

generating, by the credential system, an authentication diversified key based on a master key and a first key diversification input, wherein the master key is securely stored at the credential system and at the reader device;

generating, by the credential system, an encryption diversified key based on the master key and a second key diversification input, wherein the second key diversification input is a function of the first key diversification input;

generating, by the credential system, a credential blob including an encrypted credential for the mobile device and a portion of the second key diversification input;

transmitting, by the credential system, the credential blob to the mobile device;

performing, by the reader device in response to the mobile device being presented to the reader device, mutual authentication with the mobile device to generate a session key, wherein performing the mutual authentication involves using the authentication diversified key;

receiving, by the reader device, credential data from the mobile device, wherein the credential data includes an encrypted version of the credential blob;

generating, by the reader device, the encryption diversified key based on the master key and the second key diversification input, wherein the second key diversification input is determined based on the portion of the second key diversification input of the credential blob and the first key diversification input;

validating, by the reader device, the credential data based on the encryption diversified key; and extracting, by the reader device, the credential for use in an access control decision.

2. The method of claim 1, wherein the first key diversification input comprises a random number.

3. The method of claim 2, wherein the second key diversification input is based on the first key diversification input and a second random number different from the first random number.

4. The method of claim 3, wherein the second random number comprises the portion of the second key diversification input.

5. The method of claim 1, wherein generating the authentication diversified key comprises generating a first cipher-based message authentication code (CMAC) of the first key diversification input using the master key.

6. The method of claim 5, wherein generating the encryption diversified key comprises generating a second CMAC of the second key diversification input using the master key.

7. The method of claim 1, further comprising storing, by the mobile device, the authentication diversified key in a secure key storage separate from the first key diversification input.

8. The method of claim 7, further comprising storing, by the mobile device, the first key diversification input in an encrypted file, wherein the file is encrypted by a file key stored in the secure key storage.

9. The method of claim 1, further comprising transmitting, by the reader device, instructions to a lock device to perform an access control action based on the extracted credential.

10. The method of claim 1, wherein receiving the credential data from the mobile device comprises receiving credential data encrypted with the session key; and wherein generating the encryption diversified key comprises generating the encryption diversified key in response to decrypting the encrypted credential data using the session key.

11. An access control system for leveraging an access control architecture for detecting secure data copied between devices of the access control system, the access control system comprising:

at least one processor; and at least one memory comprising a plurality of instructions stored thereon that, in response to execution by the at least one processor, causes the access control system to:

generate, by a credential system of the access control system, an authentication diversified key based on a master key and a first key diversification input, wherein the master key is securely stored at the credential system and at a reader device of the access control system;

generate, by the credential system, an encryption diversified key based on the master key and a second key diversification input, wherein the second key diversification input is a function of the first key diversification input;

generate, by the credential system, a credential blob including an encrypted credential for the mobile device and a portion of the second key diversification input;

transmit, by the credential system, the credential blob to a mobile device of the access control system;

perform, by the reader device in response to the mobile device being presented to the reader device, mutual authentication with the mobile device to generate a session key, wherein to perform the mutual authentication involves using the authentication diversified key;

receive, by the reader device, credential data from the mobile device, wherein the credential data includes an encrypted version of the credential blob;

generate, by the reader device, the encryption diversified key based on the master key and the second key diversification input, wherein the second key diversification input is determined based on the portion of the second key diversification input of the credential blob and the first key diversification input;

validate, by the reader device, the credential data based on the encryption diversified key; and extract, by the reader device, the credential for use in an access control decision.

12. The access control system of claim 11, wherein the first key diversification input comprises a random number.

13. The access control system of claim 12, wherein the second key diversification input is based on the first key diversification input and a second random number different from the first random number.

14. The access control system of claim 13, wherein the second random number comprises the portion of the second key diversification input.

15. The access control system of claim 11, wherein to generate the authentication diversified key comprises to generate a first cipher-based message authentication code (CMAC) of the first key diversification input using the master key.

16. The access control system of claim 15, wherein to generate the encryption diversified key comprises to generate a second CMAC of the second key diversification input using the master key.

17. The access control system of claim 11, wherein the plurality of instructions further causes the access control system to store the authentication diversified key in a secure key storage of the mobile device separate from the first key diversification input.

18. The access control system of claim 17, wherein the plurality of instructions further causes the access control system to store the first key diversification input in an encrypted file of the mobile device, wherein the file is encrypted by a file key stored in the secure key storage of the mobile device.

19. The access control system of claim 11, wherein the plurality of instructions further causes the access control system to transmit, by the reader device, instructions to a lock device of the access control system to perform an access control action based on the extracted credential.

20. The access control system of claim 11, wherein to receive the credential data from the mobile device comprises to receive credential data encrypted with the session key; and wherein to generate the encryption diversified key comprises to generate the encryption diversified key in response to decryption of the encrypted credential data using the session key.

* * * * *